United States Patent
Kauppila

(10) Patent No.: US 10,021,189 B2
(45) Date of Patent: Jul. 10, 2018

(54) MULTI-CHANNEL SENSOR MEASUREMENT METHOD AND SYSTEM

(71) Applicant: VALMET AUTOMATION OY, Espoo (FI)

(72) Inventor: Jarmo Kauppila, Kajaani (FI)

(73) Assignee: VALMET AUTOMATION OY, Espoo (FI)

( * ) Notice: Subject to any disclaimer, the term of this patent is extended or adjusted under 35 U.S.C. 154(b) by 241 days.

(21) Appl. No.: 14/648,471

(22) PCT Filed: Nov. 30, 2012

(86) PCT No.: PCT/FI2012/051195
§ 371 (c)(1),
(2) Date: May 29, 2015

(87) PCT Pub. No.: WO2014/083236
PCT Pub. Date: Jun. 5, 2014

(65) Prior Publication Data
US 2015/0312350 A1    Oct. 29, 2015

(51) Int. Cl.
*H04L 29/08*    (2006.01)
*H04J 3/06*    (2006.01)
(Continued)

(52) U.S. Cl.
CPC ............. *H04L 67/125* (2013.01); *H04J 3/06* (2013.01); *H04J 3/0638* (2013.01); *G04G 7/02* (2013.01); *H04W 84/18* (2013.01)

(58) Field of Classification Search
CPC ..... G04G 7/02; G04G 7/00; H04J 3/06; H04J 3/0638; H04J 3/0667; H04J 3/0685; H04J 3/0658; H04L 67/125; H04W 84/18; H04W 56/001; H04W 56/0015; H04W 56/002; H04W 56/003; H04W 56/0035;
(Continued)

(56) References Cited

U.S. PATENT DOCUMENTS 8,050,881 B1 * 11/2011 Yeung ................ A61B 5/0024
370/503
8,699,406 B1 * 4/2014 Charles ................ H04L 7/048
370/324
(Continued)

FOREIGN PATENT DOCUMENTS

| CN | 101232520 A | 7/2008 |
|---|---|---|
| EP | 2451100 A2 | 5/2012 |
| GB | 2386983 A | 10/2003 |

OTHER PUBLICATIONS

Elson et al., "Fine-grained network time synchronization using reference broadcasts," 5th Symposium on Operating Systems Design and Implementation, Dec. (2002), pp. 147-163.
(Continued)

*Primary Examiner* — Greg C Bengzon
(74) *Attorney, Agent, or Firm* — Oliff PLC

(57) ABSTRACT

Sensor modules are triggered to start and stop the measurement approximately synchronously by sending a broadcast message. Information on the timeline of local clocks is also collected by local counters, and any relative differences in the local clocks, local sample clocks or local time stamps are rectified afterwards by means of the collected timeline information.

11 Claims, 7 Drawing Sheets

(51) Int. Cl.
*G04G 7/00* (2006.01)
*H04W 84/18* (2009.01)

(58) Field of Classification Search
CPC .......... H04W 56/004; H04W 56/0045; H04W 56/005; H04W 56/0055; H04W 56/006; H04W 56/0065; H04W 56/0075; H04W 56/008; H04W 56/0085; G01D 21/00; G06F 17/40; G06F 1/12; A61B 2562/0204; A61B 2562/0219; A61B 5/0024; A61B 5/02055; A61B 5/02438; A61B 5/1126
See application file for complete search history.

(56) References Cited

U.S. PATENT DOCUMENTS

| | | | | |
|---|---|---|---|---|
| 8,755,469 | B1* | 6/2014 | Su | H04L 27/0012 375/262 |
| 9,438,454 | B1* | 9/2016 | Su | H04L 27/0012 |
| 2004/0128091 | A1* | 7/2004 | Delin | G01D 21/00 702/75 |
| 2007/0219751 | A1* | 9/2007 | Huang | H04Q 9/00 702/187 |
| 2007/0258508 | A1* | 11/2007 | Werb | H04W 84/18 375/140 |
| 2008/0151761 | A1* | 6/2008 | Theisen | H04W 24/08 370/241 |
| 2008/0307075 | A1* | 12/2008 | Urano | G06F 1/14 709/220 |
| 2010/0103781 | A1* | 4/2010 | Rai | G06F 1/12 368/55 |
| 2010/0118737 | A1* | 5/2010 | Kim | H04L 12/4035 370/254 |
| 2010/0118895 | A1* | 5/2010 | Radulescu | G04G 7/00 370/503 |
| 2010/0177763 | A1 | 7/2010 | Van Der Stok et al. | |
| 2011/0035511 | A1 | 2/2011 | Biederman | |
| 2011/0249688 | A1* | 10/2011 | Liu | H04W 56/002 370/503 |
| 2012/0020445 | A1 | 1/2012 | DiStasi et al. | |
| 2012/0084062 | A1* | 4/2012 | Maturana | G06F 17/5022 703/6 |
| 2012/0117272 | A1 | 5/2012 | Lynch et al. | |
| 2012/0263165 | A1 | 10/2012 | Zakrzewski et al. | |
| 2013/0018620 | A1* | 1/2013 | Riendeau | G01M 5/00 702/89 |
| 2014/0029604 | A1* | 1/2014 | Nicholls | H04W 56/0015 370/350 |
| 2014/0126567 | A1* | 5/2014 | Husain | H04B 7/024 370/350 |
| 2014/0355628 | A1* | 12/2014 | Akhlaq | H04W 56/001 370/509 |
| 2016/0146646 | A1* | 5/2016 | Willis | G01D 21/00 702/89 |
| 2017/0041897 | A1* | 2/2017 | Pitigoi-Aron | H04W 56/0045 |
| 2017/0184470 | A1* | 6/2017 | Rice | H04W 24/00 |

OTHER PUBLICATIONS

Nov. 13, 2014 International Preliminary Report on Patentability issued in International Application No. PCT/FI2012/051195.
Nov. 13, 2014 International Search Report issued in International Patent Application No. PCT/FI2012/051195.
Nov. 5, 2015 Extended Search Report issued in European Patent Application No. 12888981.3.

* cited by examiner

Direction of rotation

MULTI-CHANNEL SENSOR MEASUREMENT METHOD AND SYSTEM

FIELD OF THE INVENTION

The present invention relates to sensor measurements, and particularly to multichannel measurements in a sensor network.

BACKGROUND OF THE INVENTION

Generally speaking, a sensor is a device that receives a signal or stimulus and responds with an electrical signal, while a transducer is a converter of one type of energy into another. In practice, however, the terms are often used interchangeably. Sensors and their associated circuits are used to measure various physical properties, such as temperature, force, pressure, flow, position, light intensity, etc. These properties act as the stimulus to the sensor, and the sensor output is conditioned and processed to provide the corresponding measurement of the physical property.

Sensors do not operate by themselves. They are generally part of a larger system consisting of signal conditioners and various analog or digital signal processing circuits. The larger system could be a measurement system, data acquisition system, or process control system, for example.

Sensors are used in many devices and systems to provide information on the parameters being measured or to identify the states of control. Microprocessors can make smart sensors or devices a reality. With this added capability, it is possible for a smart sensor to directly communicate measurements to an instrument or a system. In recent years, the concept of computer networking has gradually migrated into the sensor community. Networking of transducers (sensors or actuators) in a system and communicating transducer information via digital means versus analog cabling facilitates distributed measurements and control. In other words, intelligence and control, which were traditionally centralized, are gradually migrating to the sensor level. They can provide flexibility, improve system performance, and ease system installation, upgrade, and maintenance. Thus, the trend in industry is moving toward distributed control with intelligent sensing architecture. New advancement towards the minimization, reducing the cost and power requirements have motivated the researchers towards wireless sensor network. In sensor networks, different factors demand flexible and robust time synchronization, while simultaneously are making it more difficult to achieve as compared to computer networks.

One of the most important aspects of a sensor measurement system is the degree to which you can correlate in time the data acquired from multiple channels. If your data is not appropriately correlated in time, or synchronized, then your analysis and conclusions from your test data are inaccurate. In sensor networks, different factors demands flexible and robust time synchronization, while simultaneously is making it more difficult to achieve as compared to computer networks. Some sensors are also battery constrained that they only wake up occasionally, take a reading, transmit it and return to sleep, which may also complicate the synchronization task. Multiple channel measurements of the same physical target usually require that the sensors' local clocks be synchronized in frequency and phase. In the case the sensors are located close to each other, e.g. in the same apparatus, they can have a common master clock signal wired from a master to slaves. Synchronization becomes more challenging when devices working at a distance from each other must also work in conjunction over a network. Because smart sensor nodes have their own local clock, these nodes do not share global time or master clock. This lack of a global clock is problematic for multiple channel applications. Even if two clocks were synchronized at setup of the system, there is no guarantee that they will stay in synchronization. This is why the process of synchronization is continuous. Several factors can cause two identical clocks to lose synchronization. Causes such as differences in temperature, the age of the clocks themselves, and the rate of frequency can all affect the quality of synchronization. It is because of these factors that a need for clock synchronization arose.

To address this issue, several time synchronization techniques have been proposed so far. Reference Broadcast Synchronization (RBS), Flooding Time Synchronization Protocol (FTSP), Timing-sync Protocol for Sensor Networks (TPSN), IEEE 1588 and Simple Network Time Protocol (SNTP) are among the well-known synchronization methods.

IEEE 1588 provides fault tolerant synchronization for different clocks along the same network by using the precision time protocol, or PTP. The time protocol synchronizes all clocks within a network by adjusting clocks to the highest quality clock. The Best Master Clock (BMC) algorithm determines which clock is the highest quality clock within the network. The BMC (grandmaster clock) then synchronizes all other clocks (slave clocks) in the network. If the BMC is removed from the network or is determined by the BMC algorithm to no longer be the highest quality clock, the algorithm then redefines what the new BMC is and adjusts all other clocks accordingly.

SNTP is used to synchronize the clocks of networked computer system during data transfer via internet. SNTP synchronizes a computer's system time with a server that has already been synchronized by a source such as a radio, satellite receiver or modem.

However, these synchronization techniques are not optimal for correlating in time the data acquired from multiple channels in a sensor measurement system. A further disadvantage is that they must be supported in an application platform used in a smart sensor. These shortcomings are emphasized in embedded wireless solutions.

DISCLOSURE OF THE INVENTION

An object of the present invention is to provide a new method and system for a multi-channel sensor measurement.

An aspect of the invention is a method of performing multi-channel measurements, comprising
configuring a plurality of sensor nodes for a measurement task,
running an internal counter clocked by a local counter clock in each of said plurality of sensor nodes,
broadcasting a measurement start message to said plurality of sensor nodes,
starting in response to receiving said measurement start message the configured measurement task and registering a first value of the internal counter at start time of the measurement task by each of said plurality of sensor nodes,
each of said plurality of sensor nodes performs the configured measurement task with a local sample clock,
broadcasting a measurement end message to said plurality of sensor nodes,
in response to receiving said measurement end message, each of said plurality of sensor nodes registers a second value of the internal counter, each of said plurality of sensor nodes provides the result of the configured measurement task with the respective first and second values of the internal counter, and collecting the measurement results and the associated first and second values of the internal counters from said plurality of sensor nodes, and post-processing the collected measurement results of said plurality of sensor nodes based on the associated first and second values of the internal counters for compensating any difference between the local sample clocks of said plurality of sensor nodes.

In an embodiment, the post-processing comprises aligning the collected measurement results of said plurality of sensor nodes in time domain.

In an embodiment, each of said plurality of sensor nodes starts the configured measurement task immediately upon receiving the measurement start message.

In an embodiment, the broadcasting of the measurement start message or the measurement end message comprise broadcasting of the measurement start message or the measurement end message from a neighbouring sensor to said plurality of sensor nodes in response to said sensor receiving a respective start or end message from a host.

In an embodiment, the neighbouring sensor broadcast the measurement start message or the measurement end message to said plurality of sensor nodes connected to same access point or router.

In an embodiment, the measurement start message and the measurement end message are transmitted in transport protocol layer messages over a TCP/IP network, preferably in user datagram protocol, UDP, messages.

In an embodiment, the plurality of sensor nodes includes vibration sensors.

In an embodiment, the plurality of sensor nodes includes wireless sensors.

Another aspect of the invention is a measurement system comprising means for implementing the method.

Still another aspect of the invention is a sensor node for implementing the method.

In an embodiment, said sensor node comprises
means for configuring the sensor node for a measurement task,
an internal counter clocked by a local counter clock,
means for receiving a broadcasted measurement start message,
means responsive to receiving said measurement start message for starting the configured measurement task and registering a first value of the internal counter at start time of the measurement task,
means for performing the configured measurement task with a local sample clock,
means for receiving a broadcasted a measurement end message,
means responsive to receiving said measurement end message for registering a second value of the internal counter,
means for providing the result of the configured measurement task with the respective first and second values of the internal counter, and
means for sending the measurement results and the associated first and second values of the internal counters for post-processing.

In an embodiment, said sensor node comprises means for broadcasting the measurement start message or the measurement end message to said plurality of sensor nodes connected to same access point or router.

BRIEF DESCRIPTION OF THE DRAWINGS

In the following the invention will be described in greater detail by means of exemplary embodiments with reference to the accompanying drawings, in which

FIG. 2 illustrates an exemplary architecture of a smart sensor module which the principles of the present invention may be applied to;

FIG. 3B illustrates a raw data signal X from the sensor 31 (without synchronous averaging);

FIG. 3C illustrates a signal X obtained with synchronous averaging;

DESCRIPTION OF EXEMPLARY EMBODIMENTS

Principles of the present invention can be applied in all types of systems using multichannel measurements by means of sensors. Such systems may relate to process control or condition monitoring, for example. Predictive maintenance brings significant cost savings by preventing unexpected machine failures and production downtime. Condition monitoring produces real-time health information that can be utilized in planning and scheduling maintenance operations. Taking the right action at the right time guarantees maximum process availability and an efficient maintenance process. Examples of industries and plants where predicted maintenance may be applied include paper mills, pulp mills, power stations, mines and aggregates, small process industry, and petrochemical.

One field of condition monitoring is a machinery condition monitoring which may continuously monitor the mechanical condition of machinery components like bearings, drive shafts, roll covers, motors and other drive train components. Early stage warnings alert operators around the clock whenever a deviation from normal condition and performance occurs. In many applications a vibration-based condition monitoring is a central tool for predicting mechanical faults in critical machinery. In process control equipment, excessive vibration can damage the product, limit processing speeds, or even cause catastrophic machine failure. For example, a paper making is a dynamic process where mechanical conditions can deteriorate rapidly if the early warning signs are not available. Bearings, gears and other drive train components produce characteristic and sometimes very low-level vibration signals which change according to the condition of the part. As another example, at any power plant, the steam or gas turbine is not only critical with regard to production, but it is also the most expensive individual rotating machine.

In a multi-channel sensor system data can be acquired simultaneously from multiple channels, i.e. from multiple sensor modules. For example, paper machines produce a complex mixture of vibrations, pulsations and process variations. Sorting through and trying to draw relationships between these unsynchronized signals, such as torsional vibrations, can be very time consuming and frustrating. Simultaneous multi-channel analysis allows the user to focus on solving vibration or process stability problems in a specific area of the papermaking process by measuring multiple signals simultaneously. They can then be processed as raw data or synchronized to a number of rotating machinery elements or paper quality signals. The data can be sorted in a number of ways, making it possible to troubleshoot paper machine problems from several points of view.

Figure 1:
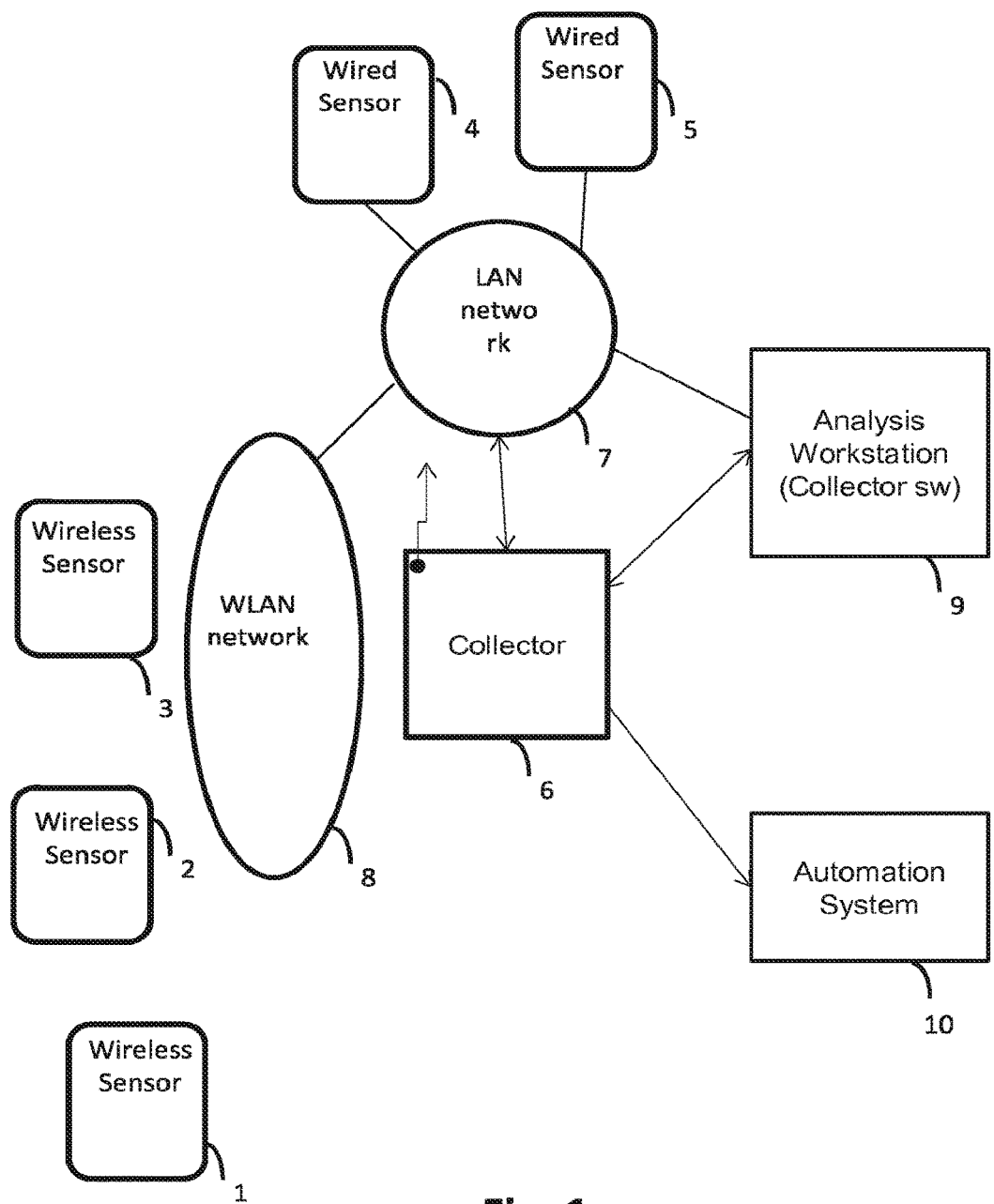
FIG. 1 illustrates an exemplary condition monitoring system.

An exemplary condition monitoring system is illustrated in FIG. 1. The condition monitoring system may include one or more sensor modules, such as sensor modules 1, 2, 3, 4 and 5, and a host system, such as a collector entity 6. Sensor modules may be wireless sensors, such as sensor modules 1, 2 and 3, and/or wired sensors, such as sensor modules 4 and 5.

Figure 2:
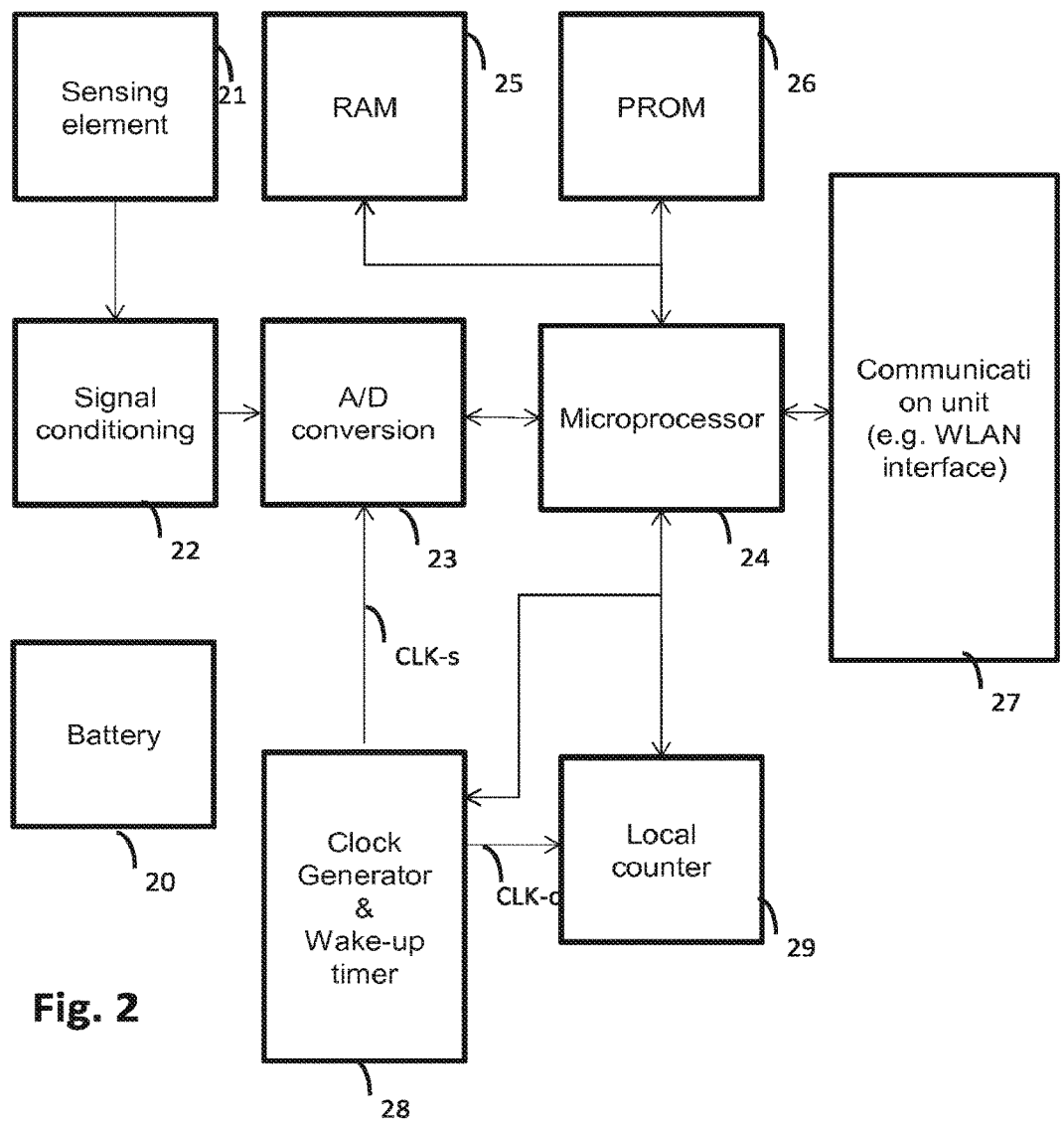

An exemplary architecture of a smart sensor module which the principles of the present invention may be applied to is illustrated in FIG. 2. An analog sensor signal output of a sensing element 21 may be conditioned and scaled in an analog conditioning stage 22. It should be appreciated that any number of sensing elements and different types of sensing elements may be associated with a single sensor module. In examples disclosed herein, a vibration sensing element, internal or external, is utilized as an exemplary sensing element 21. Another example used herein is an optical, magnetic or inductive triggering sensor. The signal conditioning 22 may include any signal conditioning, such as amplification, impedance transformation, filtering, etc. The conditioned sensor signal may be converted to a digital format through an analog-to-digital (A/D) converter 23. The digitized sensor signal can then be easily processed by a microprocessor 24. The fundamental difference between a normal sensor and a smart sensor is the use of a microprocessor 24, which can analyse data received by the sensor and perform a variety of tasks including self-diagnostics and has the ability to make decisions. The microcontroller's main tasks are to control the sensor module and process the sensor data. A state machine in the application program running on the microcontroller 24 may triggers the measurement and then collect the sensor data. For example, the sensor module may be set to data logging mode in order to collect data from a target automatically in intensive manner. The microprocessor also may respond to changes in state experienced by the sensor module. For example, the data logging may be done on timely basis or activated by high vibration level. Digitized sensor data (e.g. samples) or any other dynamic working data may be stored or buffered in an internal volatile memory, e.g. random-access memory (RAM) 25. A non-volatile memory, e.g. read-only memory (ROM) 26, may store the program code or software that the microprocessor needs to run and any configuration data required. The microprocessor 24 may be further provided with a communication unit 27 for communicating with the outside world. For example, the communication unit 27 may provide a wired Ethernet interface, or a WLAN interface including a radio frequency (RF) transceiver.

The sensor module may also be provided with a battery 20 for energising the circuits of the module. The sensor module being in a "ON" mode all time would be ideal for a sensor network that needs to ensure that all sensor data are received, analyzed, and acted on without fail. However, the longer time the sensor module is in the "ON" mode for a longer time, the higher is the energy consumption. Because the RF transceiver is the most power-hungry component of a wireless system, even a small decrease in the time that the transceiver is kept "OFF" significantly affects the overall battery lifetime. In order to efficiently manage power consumption and to improve the battery life, it may the sensor module may also be configured control and minimize the time and duration that the sensor will be fully awake, i.e. the RF transceiver and other hardware components are in the "ON" mode, and to maximize the power safe mode time, when the components are in the "OFF" mode, i.e. in sleep, while assuring the required data transfer performance. For example, the sensor module may wake upon one or more of following events: user pressing a button in the module, a timed wake-up, and high vibration level wake-up.

The sensor module may further be provided with a clock generator unit 28 which may produce the real-time clock or clocks, e.g. a local timeline, for the operation of the sensor module, and for time stamping. The clock generator unit 28 may be any clock source, typically being a crystal oscillator with a basic clock from which the other clocks or control signals can be derived, e.g. by means of counters or timers. The clock generator unit 28 may also provide a wake-up timer which enables setting the module into low-power sleep and then wake-up at pre-set point of time. In other words, it may also control the time and duration that the sensor will be in sleep. The clock generator unit 28 may also provide a low speed timer which is used to maintain real-time within the sensor module. This timer may be active also when the sensor module is at sleep state. For real-time purpose the host system may able to set current real time for the sensor module and reset the clock timer.

One of the other clocks may a sampling clock CLK_s provided to the A/D converter 23. A sample clock is a signal that controls the point in time at which samples are acquired. A/D converter 23 is able to immediately initiate a conversion in response to a clock edge at any given time, if the A/D-converter 23 is enabled by the microprocessor 24. A sample refers to a value or set of values at a point in time. The sample clock may be set to any suitable value according to an application in question. For example, the sensor module may be configurable to measure a sensor signal at rates up to 128 000 samples/second. As another example, the sensor module may be configured to measure vibration signals in three axis directions (3 dimensional measurement) at lower rates, e.g. up to 4 ks/s, for each axis direction. In a multichannel sensor system, it would be desirable to ensure that the sample clock signal CLK_s is synchronized across all the sensor modules which participate in the multichannel measurement.

Referring again to FIG. 1, the sensor modules 1, 2, 3, 4 and 5 may communicate with the host system by means of a packet switched communication. Preferably the packet switched communication may utilize an IP network (Internet Protocol), and more preferably a TCP/IP network (Transmission Control Protocol), such as a Local Area Network (LAN) 7 or a Wireless LAN (WLAN) 8. A wireless sensor module 1-3 may communicate with the host system 6 using standard Wi-Fi (IEEE 802xx) communication protocol, e.g.

over a WLAN 8. Sensor modules within a TCP/IP subnet (such as LAN 7 or WLAN 8) may comprise a sensor module network which may comprise of very large number of sensor modules.

Prior to transmitting the sensor data, the microprocessor 24 may put the sensor data in a format that can be decoded by the software application executed on the microprocessor 24 or the host 6. This may be a proprietary format and it may contain details such as the type of data being transmitted, the length of the data, the raw sensor data, an optional checksum, and a packet sequence number. This may then be encapsulated with an IP header. The IP packet thus formed may be passed to the WLAN stack which then may form a WLAN packet and transmit the packet over the air where it may be routed to the host 6 by an Access Point (AP)/router that may convert it back into an IP (Ethernet) packet.

In an exemplary embodiment, a message based application level communication protocol may be defined for communication between the sensor module 1-5 and host system 6. In order to facilitate the power safe operation of the module, the communication may be primarily initiated by the sensor module. When waking up the sensor module may send a related message to the host 6 which may then take an active role in communicating. The related message may indicate the reason for the message, such as user pressing the button, a timed wake-up, or a high vibration level wake-up.

In an exemplary embodiment, when receiving a wake-up message sent by a sensor module, the host 6 may perform one or more of the following tasks, for example, by sending one or more messages: 1) configure a measurement task for one-time execution; 2) configure time based measurements to be done by the sensor module autonomously (timed data logging); 3) configure high vibration based measurements to be done (high vibration data logging); 4) set the sensor module to wake-up on timely basis; 5) start the one-time measurement immediately or synchronously; 6) request measurement results; 7) set the sensor module to sleep.

In a multichannel sensor system, it would be desirable to ensure that the clocks are synchronized across all the sensor modules which participate in the multichannel measurement. However, in a TCP/IP network or like packet switched network, the sensor modules do not share global time or master clock, particularly if the sensor modules are not connected to the same access point or router. The sensor modules only have their own local clocks. This lack of a global clock is problematic for multiple channel applications. Even if two clocks were synchronized at setup of the system, there is no guarantee that they will stay in synchronization. This is why the process of synchronization is continuous. Several factors can cause two identical clocks to lose synchronization. Causes such as differences in temperature, the age of the clocks themselves, and the rate of frequency can all affect the quality of synchronization. It is because of these factors that a need for clock synchronization arose.

Embodiments of the present invention provide a different approach to the problem. Synchronization of the local clocks is not primarily seeked but the sensor modules are triggered to start the measurement approximately synchronously by sending a broadcast message. Information on the timeline of local clocks is also collected, and any relative differences in the local clocks, local sample clocks or local time stamps can be rectified afterwards by means of the collected timeline information. It should be appreciated the term "broadcast" as used herein refers generally to any message sent commonly to at least those sensor modules which participate in a multi-channel measurement.

In an exemplary embodiment shown in FIG. 2, a high-speed measurement timer or counter 29 is provided. The counter 29 is clocked with a counter clock CLK_c from the clock generator 28. The counter clock CLK_c may have a much higher speed than the speed of the sampling clock CLK-s, preferably 10 to 1000 times higher speed, more preferably higher than approximately 1 MHz. The counter 29 may be set, reset, started, stopped and read by the microcontroller 24 to gather the timeline information.

Figure 3A:
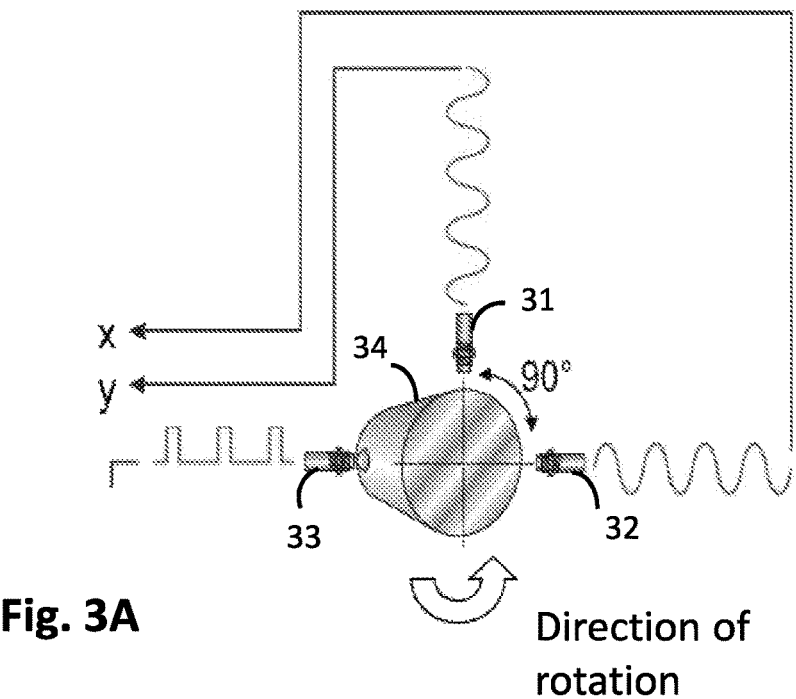
FIG. 3A illustrates an exemplary measurement configuration wherein there are three simultaneous channels, e.g. two vibration measurement channels and one triggering channel.
Figure 3D:
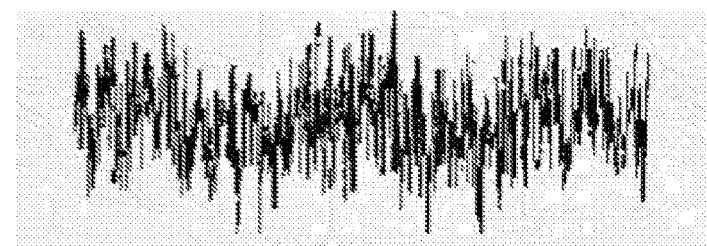
FIG. 3D illustrates the use of phase difference and amplitude of the signals X and Y for analysing the condition of a roll.
Figure 3D:
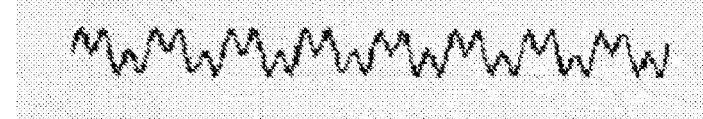
Figure 3D:
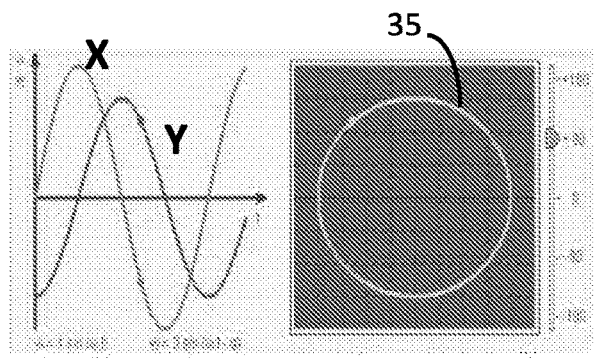

Let us now consider an example configuration wherein there are three simultaneous channels, e.g. two vibration measurement channels and one triggering channel (2+1). There is always some unbalance present in rotating elements, such in a roll 34 shown in FIG. 3A. A first vibration sensor 31 arranged to measure vibration (misalignment) of the roll 34 in the vertical direction Y, and a second vibration sensor 32 arranged to measure vibration (misalignment) of the roll 34 in the horizontal direction X. The vibration sensors may be mounted on the bearing housings of rotating elements. Synchronous averaging is used to isolate the contribution of vibration of a single rotating source, i.e. the roll 34. This is done by providing a trigger sensor 33 to obtain a tachometer trigger from the roll 34 and then timing the vibration data acquisition from the sensors 31 and 32 perfectly with the occurrence of the trigger, i.e. the rotation of the roll 34. Averaging of a series of acquisitions then removes the vibration contribution of asynchronous components (other machines in the neighbourhood)—leaving only that vibration which is synchronous with the trigger (i.e. from the roll 43). This is particularly useful for analysing the source of vibrations in an online or offline calender where many rolls are rotating at approximately the same speed and vibrations are transmitted from roll to roll through the nips. FIG. 3B illustrates a raw data signal X from the sensor 31 (without synchronous averaging), and FIG. 3C illustrates a signal X obtained with synchronous averaging. Similarly, a synchronously averaged signal Y can be obtained. Then a phase difference and amplitude of the signals X and Y can be used for analysing the condition of the roll 34, as illustrated in FIG. 3D. These synchronous averaged analyses may be displayed as circle plots (such as the plot 35 in FIG. 3D) to show irregular vibration and roll roundness problems around the circumference of the rolls. Paper quality analyses can also reveal repetitive quality faults, like barring. In order to obtain accurate analysis, also the signals X and Y shall be as synchronous as possible.

Figure 4:
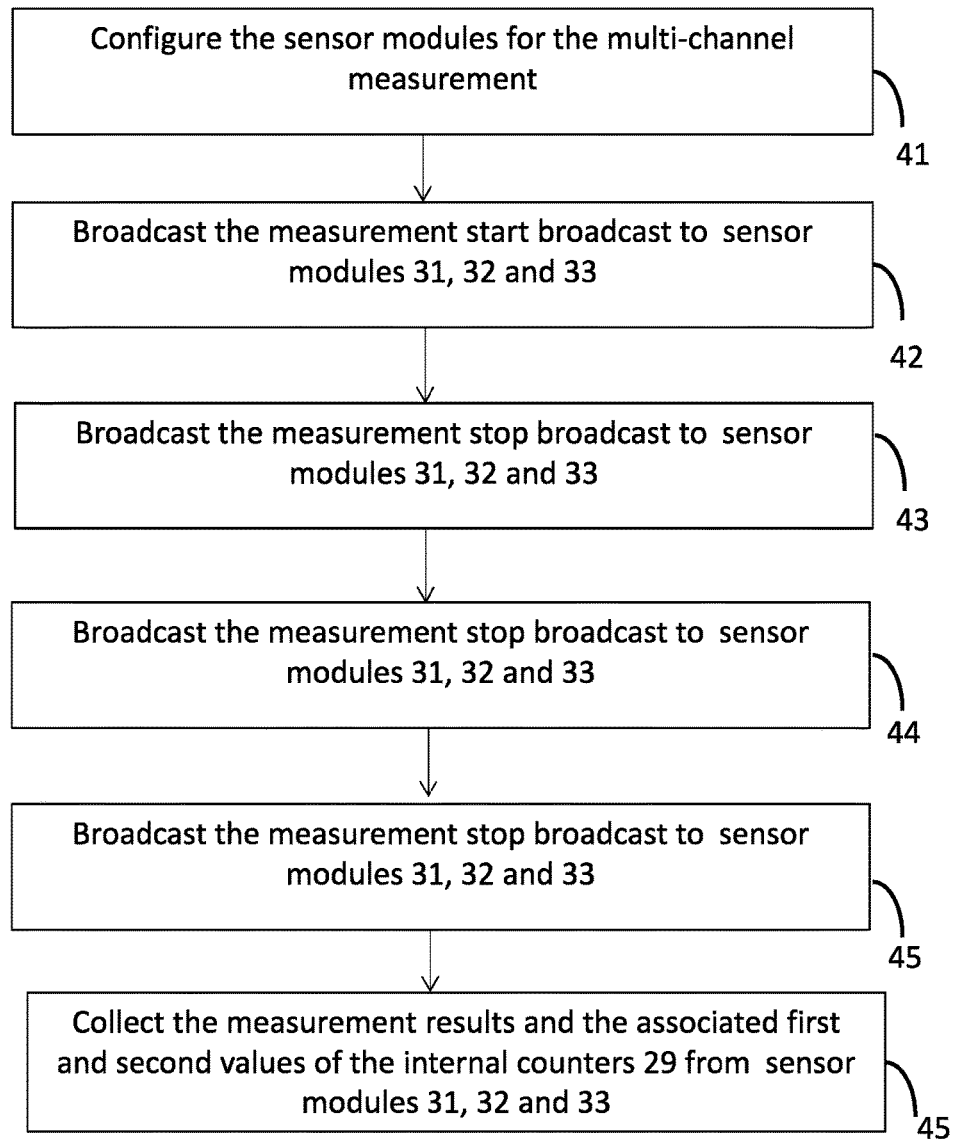
FIG. 4 a flow diagram illustrating an example of operation of a host in a multi-channel measurement.
Figure 5:
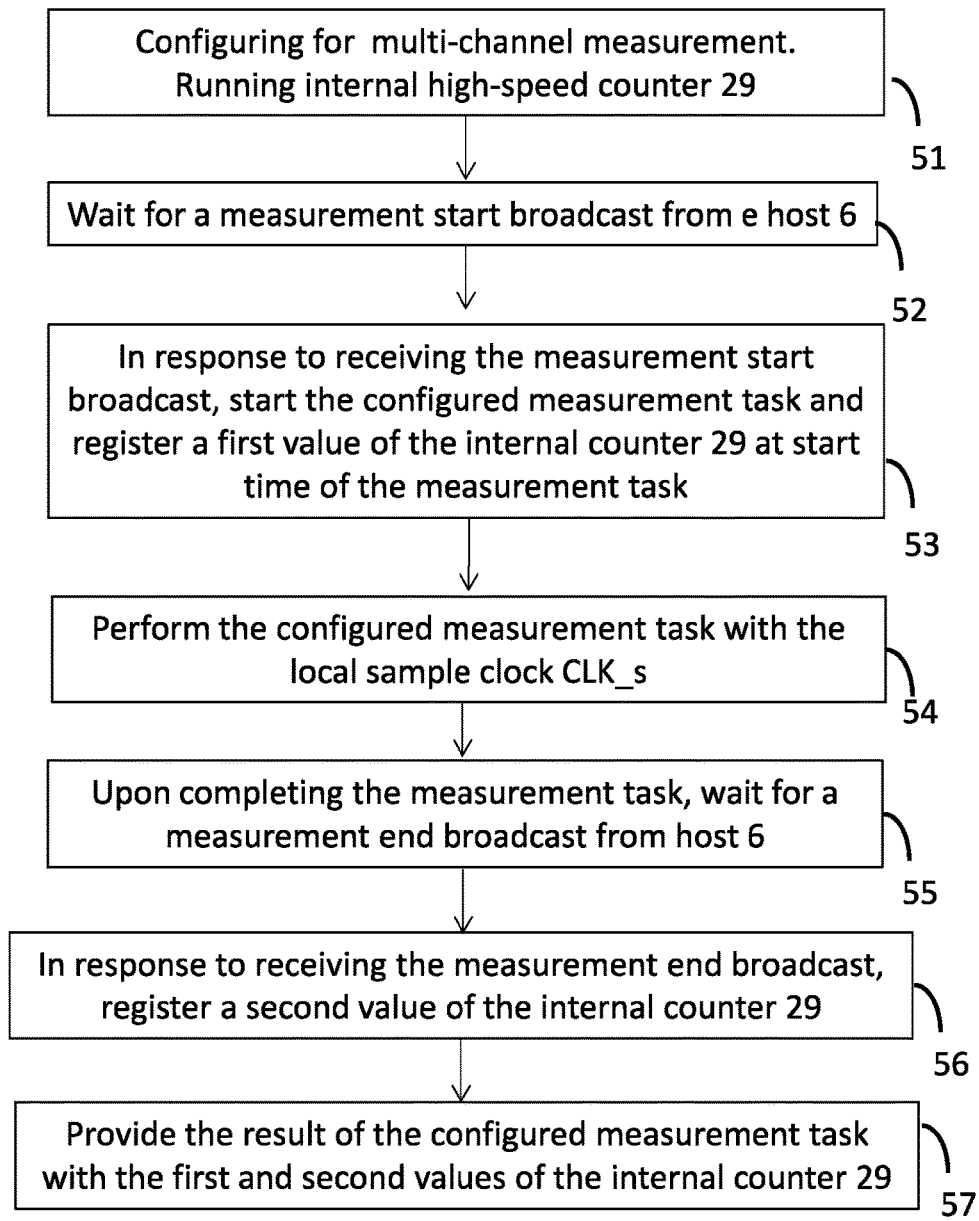
FIG. 5 a flow diagram illustrating an example of operation of a sensor module in a multi-channel measurement.

Let us assume that a host, e.g. the combiner 6, initiates a multichannel measurement described above. Referring to FIGS. 4 and 5, the host 6 may configure each of the sensor modules 31, 32 and 33 separately for the measurement task (step 41 in FIG. 4). In other words, the sensor modules 31, 32 and 33 may be configured asynchronously at different times. The configuration is performed over a TCP/IP network, such as WLAN 6 or LAN 7. Each sensor module is configured for the multi-channel measurement (step 51 in FIG. 5), the internal counter is running, and each sensor module assumes a mode wherein it only waits for a measurement start broadcast (e.g. an UDP broadcast) from the host 6 (step 52). The host 6 broadcasts the measurement start broadcast to the sensor modules 31, 32 and 33 over the TCP/IP network (step 42 in FIG. 4). Only one broadcast message may be sent. In response to receiving the measurement start broadcast, each sensor module 31, 32 and 33 immediately starts the configured measurement task and registers a first value of the internal counter 29 at start time of the measurement task (step 53 in FIG. 5). Each sensor module performs its configured measurement task with the local sample clock CLK_s (step 54 in FIG. 5A) and stores the measured samples. The measurement task configuration may define duration of the actual measurement. Upon completing the measurement task, each sensor module assumes a mode wherein it waits for a measurement end broadcast (e.g. an UDP broadcast) from the host 6 (step 55). The host 6 broadcast a measurement end message to the sensor modules 31, 32 and 33 over the TCP/IP network (step 43 in FIG. 4). Only one broadcast message may be sent. In response to receiving the measurement end broadcast, each sensor module ends the configured measurement task and registers a second value of the internal counter 29 (step 56 in FIG. 5). Each sensor module 31, 32 and 33 provides the result of the configured measurement task with the respective first and second values of the internal counter 29. The host, such as the collector 6, may collect the measurement results and the associated first and second values of the internal counters 29 from the sensor modules 31, 32 and 33 at any time after the measurement. The collection need not be synchronous but it can be done separately and at different times for each sensor module.

It should be appreciated that the host is not restricted to the collector 6, but the host may be any unit or system communicating with the sensor modules over TCP/IP or like network, such a monitoring or analysis workstation 9, or an automation system 10, for example. The unit or system may be provided with appropriate software implementing the multi-channel measurement.

In an exemplary embodiment, sensor modules participating in a multi-channel measurement may be within a service area of the same access point or router in the network. As a consequence, the measurement start/end broadcast is received substantially at the same time at all of the participating sensor modules.

In exemplary embodiments, if a network entity, such as the host 6, is not within a service area of the same access point or router as the sensor modules participating in a multi-channel measurement, one of the sensor modules within the service area of the same access point or router may send the measurement start/end broadcast to other sensor modules. The broadcasting sensor module may send the broadcast in response to a start/end message received from the host. The sensor module may send the broadcast immediately upon receiving a respective message from the host, or with a delay. Alternatively, the host may configure the sensor module to perform timed broadcasts. The broadcasting sensor module may be or may not be one of the participating sensor modules.

In exemplary embodiments, the measurement start broadcast and the measurement end broadcast may be UDP protocol (User Datagram Protocol) messages in the transport layer in an IP network. With UDP, messages, in this case referred to as datagrams, can be sent to the sensor modules on an IP network without prior communications to set up special transmission channels or data paths. UDP uses a simple transmission model with a minimum of protocol mechanism. It has no handshaking dialogues, and thus exposes any unreliability of the underlying network protocol to the user's program. As this is normally IP over unreliable media, there is no guarantee of delivery, ordering or duplicate protection. On the other hand, UDP is suitable for time-sensitive broadcast according to embodiments of the invention, since there is minimum delay in the message transmission.

Figure 6:
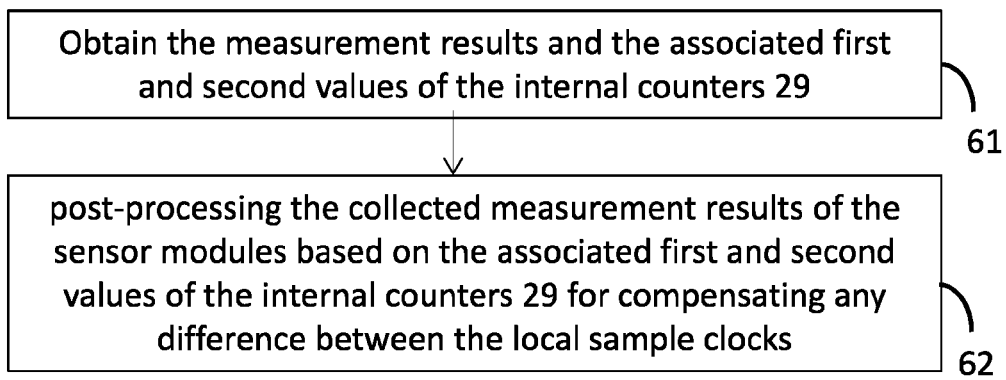
FIG. 6 is a flow diagram illustrating an example of post-processing upon collecting the measurement results.

An analysis unit or post-processing unit, for example the collector 6, the monitoring or analysis workstation 9, or an automation system 10 may comprise software or other means for post-processing the collected measurement results. Referring now to FIG. 6, the analysis or post-processing unit may obtain the measurement results and the associated first and second values of the internal counters 29 associated with the multi-channel measurement (step 61). Then the analysis or post-processing unit may post-process the measurement results of the sensor modules 31, 32 and 33 based on the first and second values of the internal counters 29 in order to compensate possible differences between the local sample clocks of the sensor modules (step 62). The post-processing may comprise aligning the collected measurement results of sensor modules in time domain.

Figure 7A:
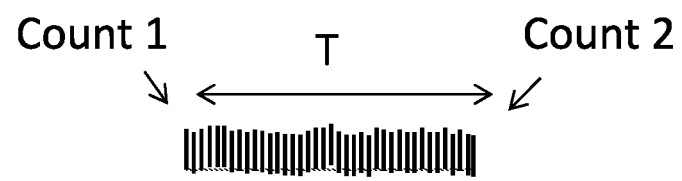
FIGS. 7A, 7B, 7C and 7C illustrate an example of correcting the measurement results based on the associated counter values to compensate the difference in local sample clocks.
Figure 7B:
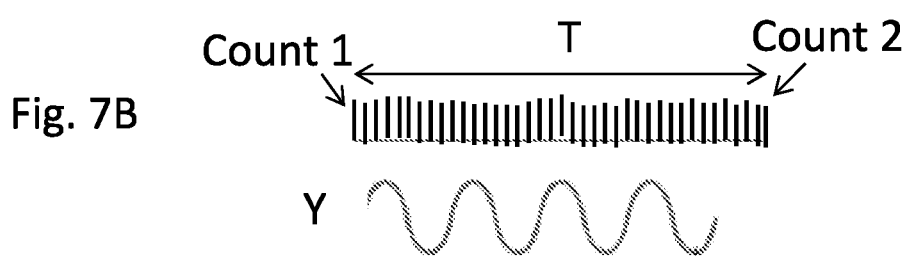
Figure 7C:
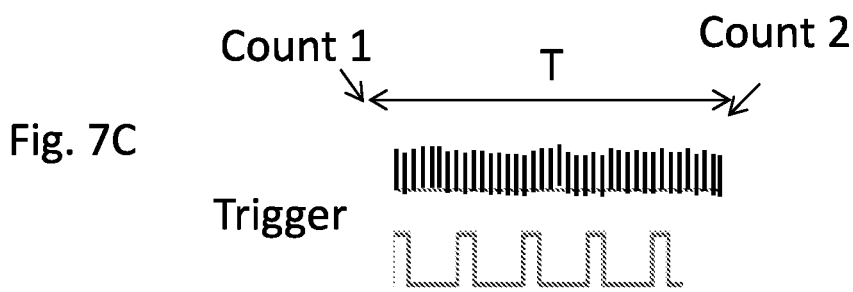
Figure 7D:
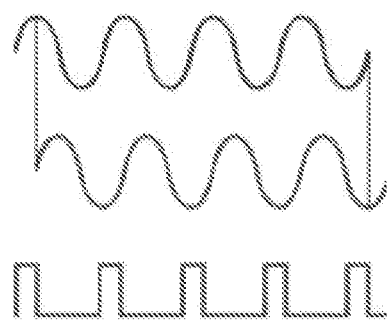

Let us study the post-processing by means of an example. In the measurement configuration shown in FIG. 3, wherein the sensor modules 31, 32 and 33 are configured to measure the signals Y, X and Trigger, respectively. The sensor modules 31, 32 and 33 receive the measurement start broadcast substantially at the same time. Each sensor module 31, 32 and 33 registers the current value COUNT1 of its internal counter 29 and starts the measurement. After having stopped the measurement, each sensor module 31, 32 and 33 will wait for the measurement end message. Upon receiving the measurement end message, each sensor module 31, 32 and 33 registers its current value COUNT2 of its internal counter 29. The measurement results of the sensor modules 32, 31 and 33 are illustrated FIGS. 7A, 7B and 7C, respectively. The local clocks are not synchronous or even exactly identical, and therefore also the sample clocks CLK_s and the counter clock CLK_c differ from each other. However, the counter values COUNT1 and COUNT2 have been registered simultaneously at all sensor modules, and as the time period T between the counter values COUNT1 and COUNT2 is known, the error caused by the different and asynchronous clocks can be corrected or compensated. Let us select the timeline of the sensor module 31, i.e. the signal Y in FIG. 7B as a reference. Now using the known time period T and the counter values, we can align the measurement results of signals X and Trigger with the signal Y. As a result, we will obtain "post-synchronized" measured signals for further analysis or display, as illustrated in FIG. 7D.

It will be obvious to a person skilled in the art that, as the technology advances, the inventive concept can be implemented in various ways. The invention and its embodiments are not limited to the examples described above but may vary within the scope of the claims.

The invention claimed is:

1. A method of performing multi-channel measurements, comprising
configuring a plurality of sensor nodes for a measurement task,
running an internal counter clocked by a local counter clock in each of said plurality of sensor nodes,
broadcasting a measurement start message to said plurality of sensor nodes,
starting in response to receiving said measurement start message the configured measurement task and registering a first value of the internal counter at start time of the measurement task by each of said plurality of sensor nodes,
each of said plurality of sensor nodes performs the configured measurement task with a local sample clock,
broadcasting a measurement end message to said plurality of sensor nodes, in response to receiving said measurement end message, each of said plurality of sensor nodes registers a second value of the internal counter, each of said plurality of sensor nodes provides the result of the configured measurement task with the respective first and second values of the internal counter, and collecting the measurement results and the associated first and second values of the internal counters from said plurality of sensor nodes, and post-processing the collected measurement results of said plurality of sensor nodes based on the associated first and second values of the internal counters for compensating any difference between the local sample clocks of said plurality of sensor nodes, the post-processing comprising aligning the collected measurement results of said plurality of sensor nodes in time domain.

2. A method according to claim 1, wherein, each of said plurality of sensor nodes starts the configured measurement task immediately upon receiving the measurement start message.

3. A method according to claim 1, wherein the broadcasting of the measurement start message or the measurement end message comprise broadcasting of the measurement start message or the measurement end message from a neighbouring sensor to said plurality of sensor nodes in response to said sensor receiving a respective start or end message from a host.

4. A method according to claim 3, wherein the neighbouring sensor broadcasts the measurement start message or the measurement end message to said plurality of sensor nodes connected to same access point or router.

5. A method according to claim 1, wherein said local counter clock is substantially higher in frequency than said local sample clock.

6. A method according to claim 1, wherein the measurement start message and the measurement end message are transmitted in transport protocol layer messages over a TCP/IP network, preferably in user datagram protocol, UDP, messages.

7. A method according to claim 1, wherein the plurality of sensor nodes includes vibration sensors.

8. A method according to claim 1, wherein the plurality of sensor nodes includes wireless sensors.

9. A sensor node, comprising
an internal counter clocked by a local counter clock,
a communication unit configured to receive a broadcasted measurement start message and receiving a broadcasted measurement end message,
a controller that:
in response to receiving said measurement start message starts the configured measurement task and registers a first value of the internal counter at start time of the measurement task, and
in response to receiving said measurement end message registers a second value of the internal counter,
a measuring circuitry which produces results of the configured measurement task with a local sample clock that is substantially lower in frequency than said local counter clock, the controller provides the results of the configured measurement task with the respective first and second values of the internal counter and sends the measurement results and the associated first and second values of the internal counters via the communication unit for post-processing, the post-processing comprising aligning the collected measurement results of the plurality of sensor nodes in time domain.

10. A multichannel sensor system, comprising
a plurality of sensor nodes connected to a communication system,
a processor and a memory, the processor being configured to:
broadcast a measurement start message and a measurement end message to the plurality of sensor nodes to control the configured measurement task;
each of said plurality of sensor nodes comprising:
an internal counter clocked by a local counter clock,
a communication unit configured to receive the broadcasted measurement start message and receiving the broadcasted measurement end message,
a controller that:
in response to receiving said measurement start message starts the configured measurement task and registers a first value of the internal counter at start time of the measurement task, and
in response to receiving said measurement end message registers a second value of the internal counter,
a measuring circuitry which produces results of the configured measurement task with a local sample clock that is substantially lower in frequency than said local counter clock,
the controller provides the results of the configured measurement task with the respective first and second values of the internal counter and sends the measurement results and the associated first and second values of the internal counters via the communication unit to the host system,
the measurement control unit being configured to collect the measurement results and the associated first and second values of the internal counters from said plurality of sensor nodes; and
post-process the collected measurement results of said plurality of sensor nodes based on the associated first and second values of the internal counters in order to compensate any difference between the local sample clocks of said plurality of sensor nodes, the post-processing comprising aligning the collected measurement results of the plurality of sensor nodes in time domain.

11. A system according to claim 10, wherein the host system is configured to broadcast the measurement start message or the measurement end message to said plurality of sensor nodes connected to same access point or router in the communication system.

* * * * *